(12) United States Patent
King

(10) Patent No.: US 7,210,539 B2
(45) Date of Patent: May 1, 2007

(54) HOLE TRIMMER

(76) Inventor: Bernard Newton King, 43 Cameron Street, Hawera (NZ)

( * ) Notice: Subject to any disclaimer, the term of this patent is extended or adjusted under 35 U.S.C. 154(b) by 0 days.

(21) Appl. No.: 10/486,172

(22) PCT Filed: Aug. 2, 2002

(86) PCT No.: PCT/NZ02/00146

§ 371 (c)(1),
(2), (4) Date: Aug. 2, 2004

(87) PCT Pub. No.: WO03/011403

PCT Pub. Date: Feb. 13, 2003

(65) Prior Publication Data

US 2004/0244347 A1    Dec. 9, 2004

(30) Foreign Application Priority Data

Aug. 2, 2001    (NZ) ..................................... 513315

(51) Int. Cl.
*A01B 1/00*    (2006.01)

(52) U.S. Cl. ..................................... 172/371

(58) Field of Classification Search ................. 172/25, 172/27, 41, 19, 22, 371

See application file for complete search history.

(56) References Cited

U.S. PATENT DOCUMENTS 1,340,927 A * 5/1920 Whitman ..................... 172/1
3,565,179 A * 2/1971 Paliani ........................ 172/19
4,846,286 A * 7/1989 McNeely et al. ........... 172/379
4,884,638 A * 12/1989 Hoffman ...................... 172/22
4,947,938 A * 8/1990 Fricke et al. ................ 172/22
4,958,688 A * 9/1990 Marrow et al. .............. 172/22
5,337,831 A * 8/1994 Chopp ......................... 172/22
5,865,258 A * 2/1999 McGrew, II ................. 172/22

FOREIGN PATENT DOCUMENTS

| GB | 165547 | | 7/1921 |
| GB | 2182532 A | * | 5/1987 |
| WO | WO 94/27687 A1 | | 12/1994 |
| WO | WO 9427687 A1 | * | 12/1994 |

* cited by examiner

Primary Examiner—Victor Batson
(74) Attorney, Agent, or Firm—Blakely, Sokoloff, Taylor & Zafman; Stephen M. De Klerk

(57) ABSTRACT

A hole trimmer (10) for removing peripheral material projecting inside a hole (1), including a severing mechanism (11) with first (14) and second (15) opposing cutting surfaces, configured such that the first cutting surface (14) is incapable (whilst the second cutting surface (15) is capable) of passing through the hole (1). The hole trimmer also includes an actuation mechanism (12) for reversibly moving the first (14) and second cutting surfaces (15) towards and away from each other. The first cutting surface has a lower surface intersected by the actuation mechanism. In use, the second cutting surface (15) is inserted into the hole (1) the actuation mechanism (12) is then activated to move the second cutting surface (15) into abutting contact with the lower surface of the first cutting surface (14) severing any material interposed therebetween.

14 Claims, 6 Drawing Sheets

HOLE TRIMMER

CROSS-REFERENCE TO OTHER APPLICATIONS

This Application is a National Phase of International Application No. PCT/NZ02/00146, filed on Aug. 2, 2002, which claims priority from New Zealand Patent Application No. 513315, filed on Aug. 2, 2001.

TECHNICAL FIELD

The present invention relates generally to a means of trimming material around the periphery of a hole and more specifically to means of maintaining golf holes and the like.

BACKGROUND ART

The game of golf is one of the most longstanding and widely played games to date. One of the virtues of golf is its intrinsic simplicity requiring a minimum of equipment and possessing few complex rules. However, due in part to the heightened media coverage of golf at the top level and a corresponding increase in popularity with the game as a whole, a greater emphasis has been placed on the standard and maintenance of existing and new golf courses.

Whilst differing settings for the golf courses engender different feelings of challenge, satisfaction and general well-being to the players, the ultimate focus of each game is primarily the actual golf hole itself. Whilst the golf hole may not normally receive much direct consideration from the players it is nevertheless a fundamental requirement that each hole should be of a uniform size and standard and that deterioration of the golf hole periphery which may affect player's strokes is kept to an absolute minimum.

The maintenance of a golf course is primarily the work of a relatively small number of people i.e., green keepers and possibly some support staff who may or may not be paid and/or full time dependent on the size of the golf club. Large high profile international venues would clearly have greater resources for support staff and equipment and would be expected to maintain each hole in a pristine condition. The level of maintenance at less prestigious clubs extending through to local town and private golf clubs would naturally be somewhat lower, and consequently individual golf holes would be expected to be used for more prolonged periods without maintenance.

Although the timing of the following sequence would vary according to the available resources of the golf club as discussed above, a fresh hole would initially be cut by known means using a cylindrical golf hole cutter and the extracted turf and earth (assuming the presence of a previous hole) is replaced into the existing hole. A substantially cylindrical plastic holder is inserted into the bottom of the golf hole and this provides lateral support for the hole walls and a central aperture for the insertion of a flag.

The hole would then be left untouched for a period of time until the performance of remedial maintenance by the grounds staff. Such procedures include the trimming/removing of any overhanging dirt and/or grass surrounding the periphery of the hole which may respectively have sagged inwards over the top of the golf holder insert or, dependent on the time scale involved simply have grown in place.

Existing tools for such maintenance include scissors—both conventional and shaped, curved pressure boards and cutting implements. The work is time consuming and requires skilled input. The typical restrictions on resources and time available for such maintenance places a direct limitation on the frequency in which all the holes of the golf course may be attended. After a given time, the ground staff would determine that a hole may no longer be successfully maintained and a fresh golf hole would be cut. The earth and turf extracted from the new hole would be replaced into the old hole and the sequence would be repeated.

Clearly, any device which would speed the process of maintaining the golf holes would be advantageous to both the ground staff,—by virtue of their increased efficiency, and eventually to the players by a possible lowering of green fees and/or any other overhead-related costs.

Furthermore, it would be also advantageous to provide a means of ensuring a uniform and accurate golf hole could be provided with minimum of expertise to ensure that each hole meets the desired dimensional requirements of the respective governing bodies of the sport.

There are also other non-golfing applications where it is desirable to trim material from the edge of an aperture where access is only possible or convenient from one side of the aperture. This type of restriction may be found in a variety of applications where an existing aperture may have been formed with a roughened edge and requires a precise finishing, such as apertures in large sheets of paper, carpet, walls, roofs, floors, piping and so forth.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a hole trimmer capable of removing peripheral material projecting inside a perimeter of a hole in the ground, said hole trimmer including:

a severing mechanism with first and second substantially opposed cutting surfaces, configured such that said first cutting surface is incapable of passing through said perimeter, whilst said second cutting surface is capable of passing through said perimeter;

an actuation mechanism capably of reversibly moving said first and second cutting surfaces towards and away from each other about a first longitudinal axis, wherein said first cutting surface has a substantially planar lower surface intersected by said actuation mechanism;

and wherein, in use, said second cutting surface is capable of being inserted through said hole past said material until said first substantially planar lower surface contacts said perimeter, whereupon, said actuation mechanism is activated to move said second cutting surface along said first longitudinal axis into abutting contact with the planar lower surface of said first cutting surface, severing any material interposed therebetween.

As used herein, said material denotes material which is at least partially flexible, elastic and/or resilient and capable of being pushed aside by said second cutting surface and thereupon at least partially returning towards its original position.

According to one embodiment, said first cutting surface is substantially planar and; with respect to said first longitudinal axis, laterally enlarged in comparison to said second cutting surface.

Preferably, the said hole is a circular golf hole and wherein said second cutting surface is sized to correspond to said golf hole.

However, it will be readily appreciated that the hole trimmer may be configured for use with a hole of any size and configuration, including oval, hexagon, square, irregular shapes and so forth.

When applied to trimming golf holes, the said peripheral material may include grass, soil, sand, and any other material overhanging or projecting into the golf hole beyond the prescribed size. However, in alternative non-golfing applications, the said material may include any cuttable material including plastics, metal, paper, carpet, foam and so forth.

Preferably, said cutting contact occurs about an at least partially circular outer perimeter of said second cutting surface orientated perpendicular to the first longitudinal axis.

Preferably said second cutting surface is located peripherally on an upper surface of a circular disc, preferably with an opposing lower surface shaped to facilitate entry into said hole past said peripheral material.

In the event that a part-circular second cutting surface is utilised, a circular hole may nevertheless be trimmed by successively bringing the cutting surfaces into abutting contact, releasing same, rotating the part-circular second cutting surface through an incremental angle and repeating the sequence until a complete circle has been trimmed. However, this configuration has the potential risk of producing a non-circular hole due to variations in the location of the cutting surfaces during the successive cutting actions.

In one embodiment of the present invention, said first cutting surface may be a substantially planar surface orientated perpendicular to said first longitudinal axis.

Preferably, said abutting contact is formed by a sharpened edge on said second cutting surface engaging simultaneously at all points of the sharpened edge in a pressure contact with the substantially planar lower surface of said first cutting surface.

Preferably, said first cutting surface is a (optionally hardened) plate, with a planar lower surface intersected by said actuation mechanism.

In an alternative embodiment, the second cutting surface may be formed with a planar upper surface capable of engaging in cutting contact with a sharpened edge located on said first cutting surface.

The mechanism of severing material from the periphery of the hole by pressing a sharpened edge against a hardened plate utilises a 'crushing' action. It will be seen that it is possible to arrange the two essential features of this mechanism, i.e.—the sharpened edge and the opposing hardened contact surface, to be arranged on either of said opposed first or second cutting surfaces respectively or vice versa.

However, placing the sharpened edge on the second cutting surface permits the use of a simple plate for the first cutting surface without the need to produce a raised cutting portion within the perimeter of the planar surface.

Preferably, the said actuation mechanism includes an elongated rod attached to said second cutting surface and extending through an aperture in said first cutting surface along said first longitudinal axis to an actuation mechanism.

Preferably, said actuation mechanism is capable of providing linear movement of said second cutting surface into and out of cutting contact with said first cutting surface.

Preferably, said actuation mechanism is composed of manually operable mechanical linkages, preferably providing force multiplication of a user's manual input by a known mechanical advantage configuration.

In an alternative embodiment, said actuation mechanism is provided by an electrical, hydraulic or pneumatic drive.

In order to produce a practical and cost effective tool for trimming and maintaining golf holes, a purely mechanical, user powered actuation mechanism is desirable, particularly in view of the distance to a suitable alternative power source on a typical golf course.

However, in alternative applications such as trimming the periphery of existing holes where it is difficult or impractical to access both sides of the hole independently (e.g. trimming/enlarging specific holes in flooring, pipes, walls and so forth), alternative power supplies may be more feasible.

According to a further aspect of the present invention, there is provided a method of removing peripheral material projecting inside a perimeter of a hole utilizing the hole trimmer substantially as described above, said method including:

inserting said second cutting surface into said hole past said peripheral material, until said first cutting surface contacts said hole perimeter;

activating said actuation mechanism move said second cutting surface into cutting contact with said first cutting surface, severing any material interposed therebetween.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
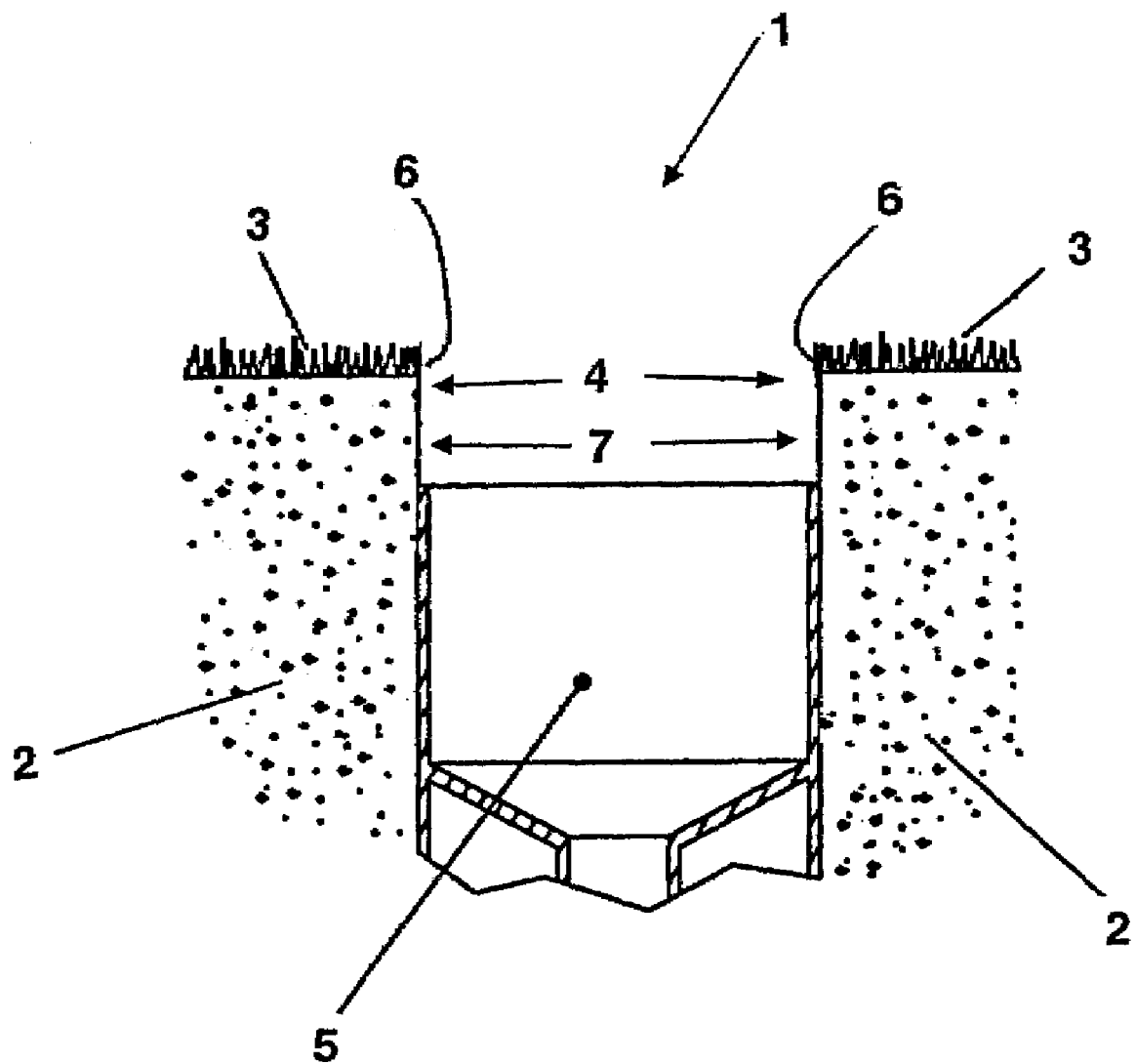
FIG. 1 shows a side elevation of a cross section through a standard golf hole provided with a standard hole cup.

Golf holes are by definition items in which variation between different holes and different golf courses is undesirable and to which the green keeping staff of various golf courses strive to eliminate. FIG. 1 shows a section through a standard cylindrical golf hole (1) cut into the earth (2) beneath a golf green surface (3).

In order to maintain the desired dimensions and depth of the golf hole (1), and to furthermore provide location and support for the insertion of a golf tee flag (not shown), a cup (5) is inserted into virtually every golf hole (1). The cup (5) is typically formed from cast aluminium and is required by international golfing rules to be located at a prescribed distance below the surface of the green of approximately 20 mm. This prevents the intrusion of the cup (5) from reducing the prescribed diameter (4) of the golf hole at the hole-green interface which is required to be of precisely 108 mm diameter (4¼ inches) according to international golfing regulations.

However, the absence of lateral support in the vertical region above the golf cup (5) and the surface of the green (3) can lead to deterioration of the desired shape and dimensions of the golf hole (1).

Figure 2:
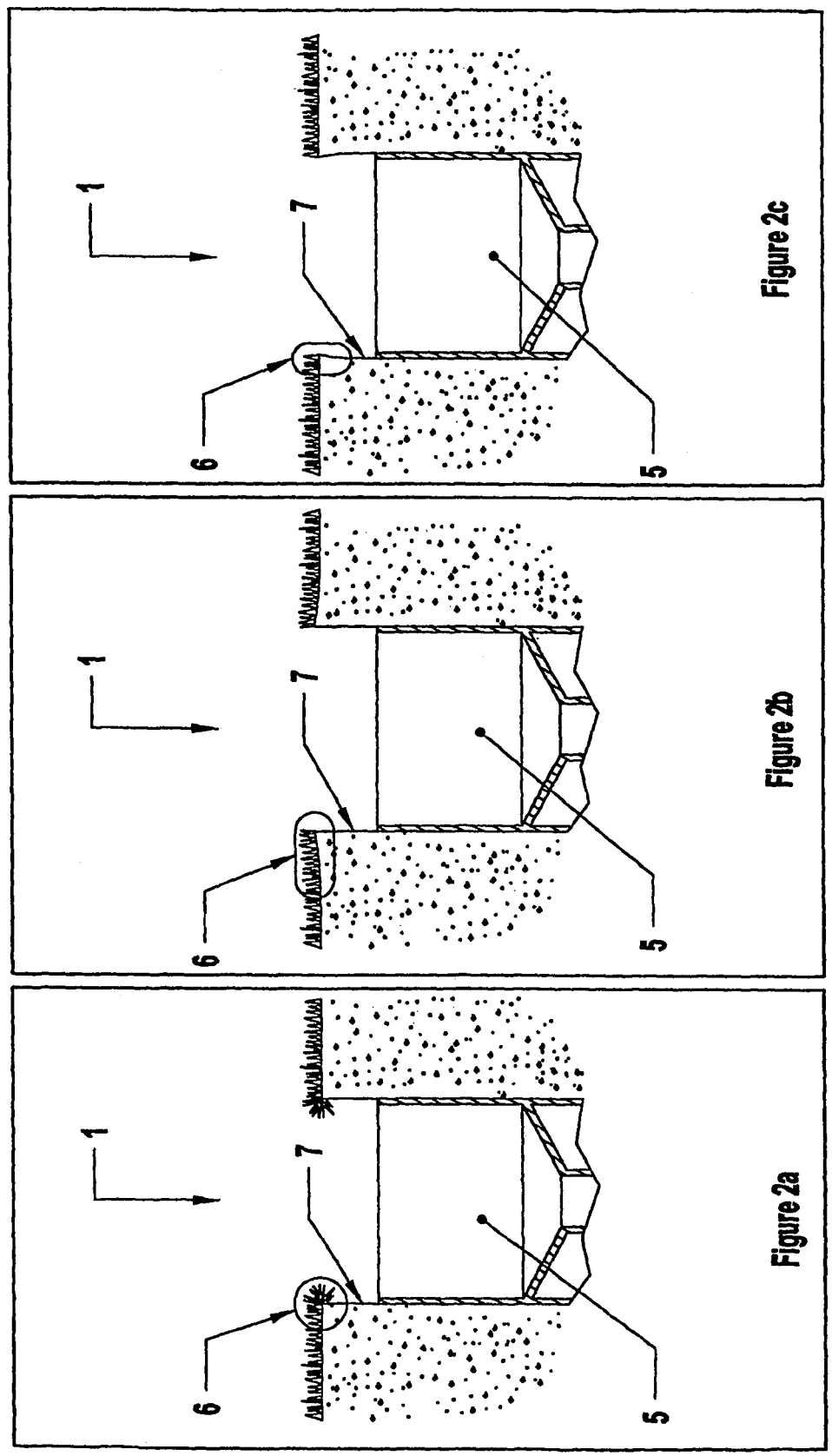
FIG. 2A shows a side elevation of the top portion of a golf hole as shown in FIG. 1 including fresh growth overhanging the hole periphery.
FIG. 2B shows a side elevation of the top portion of a golf hole as shown in FIG. 1 displaying peaking around the hole periphery.
FIG. 2C shows a side elevation of the top portion of a golf hole as shown in FIG. 1 showing a size reduction of the hole diameter.

FIGS. 2(a)–(c) show means in which the golf hole may deteriorate without remedial maintenance. The types of deterioration can include the growth of fresh grass overhanging the edge of the hole periphery (6), as shown in FIG. 2(a), or the peaking or localised raising of the hole periphery (6) as shown in FIG. 2(b), or the reduction in diameter (4) of the hole (1) due to the portions of the hole side wall (7) between the top of cup (5) and the hole periphery (6) being inclined inwards as shown in FIG. 2(c). These undesirable conditions can occur after only one to two days and often eventuate during weather conditions which prevent the extensive use of the golf course by players.

Although the green maintenance staff can use various tools such as curved-blade scissors, pressure boards and so forth to tidy holes (1) from deterioration, none provide an adequate means of maintaining the critical 4¼ inch diameter (4) nor an accurate circular periphery (6) concentric with the cylindrical hole shape.

The plug cutter (not shown) used to produce a golf hole (4) often forms undersized diameter holes. As a result, when the cup (5) is pushed into the hole (1), the remaining exposed portion of the hole (1) wall (7) subsequently settle inwards to stabilise at a hole diameter (4) of approximately 2–3 mm undersize. This can be due not only to wear in the plug cutter but also to various turf conditions. The majority of golf courses do not replace pin locations daily. One to two week intervals between hole replacements are common with many clubs cutting two holes simultaneously on each green and alternating play on a daily basis. The present invention enables such holes to be trimmed with relative ease and lack of specialised training to enable the life span of a hole to be extended significantly.

Figure 3:
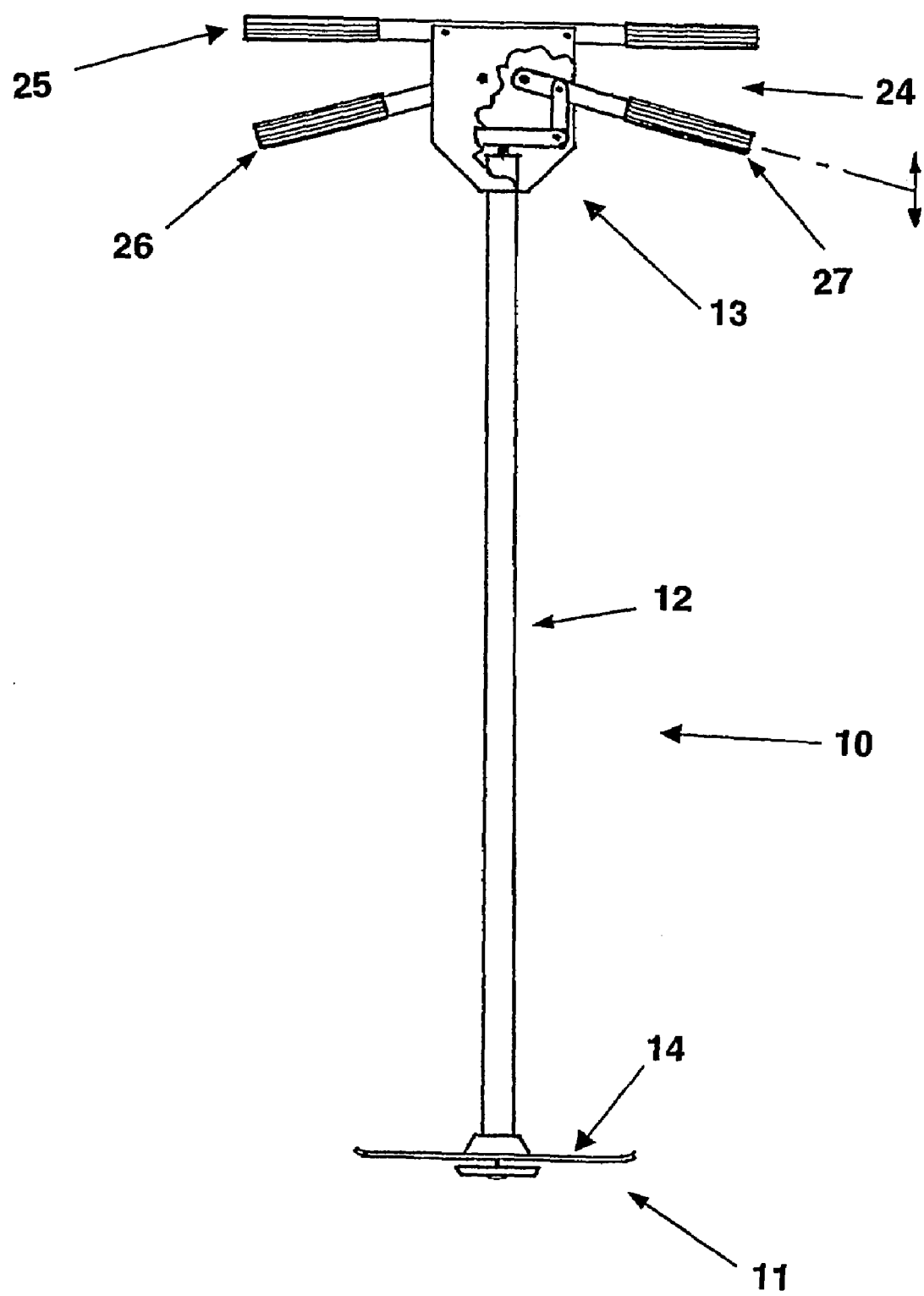
FIG. 3 shows a side elevation of a hole trimmer of the present invention.

FIG. 3 shows a first preferred embodiment of the present invention of a hole trimmer (10) adapted for removing peripheral material from the inside perimeter of an aperture, ie golf hole periphery (6) and is composed of a severing mechanism (11), and actuation mechanism (12) which includes an actuation mechanism (13). Although specifically intended for use with trimming golf holes (1), it will be appreciated that the present invention may be applied to any application where an existing aperture possesses extraneous material about its periphery which needs to be removed and where it is more expedient to do so from one side of the aperture only.

Figure 4:
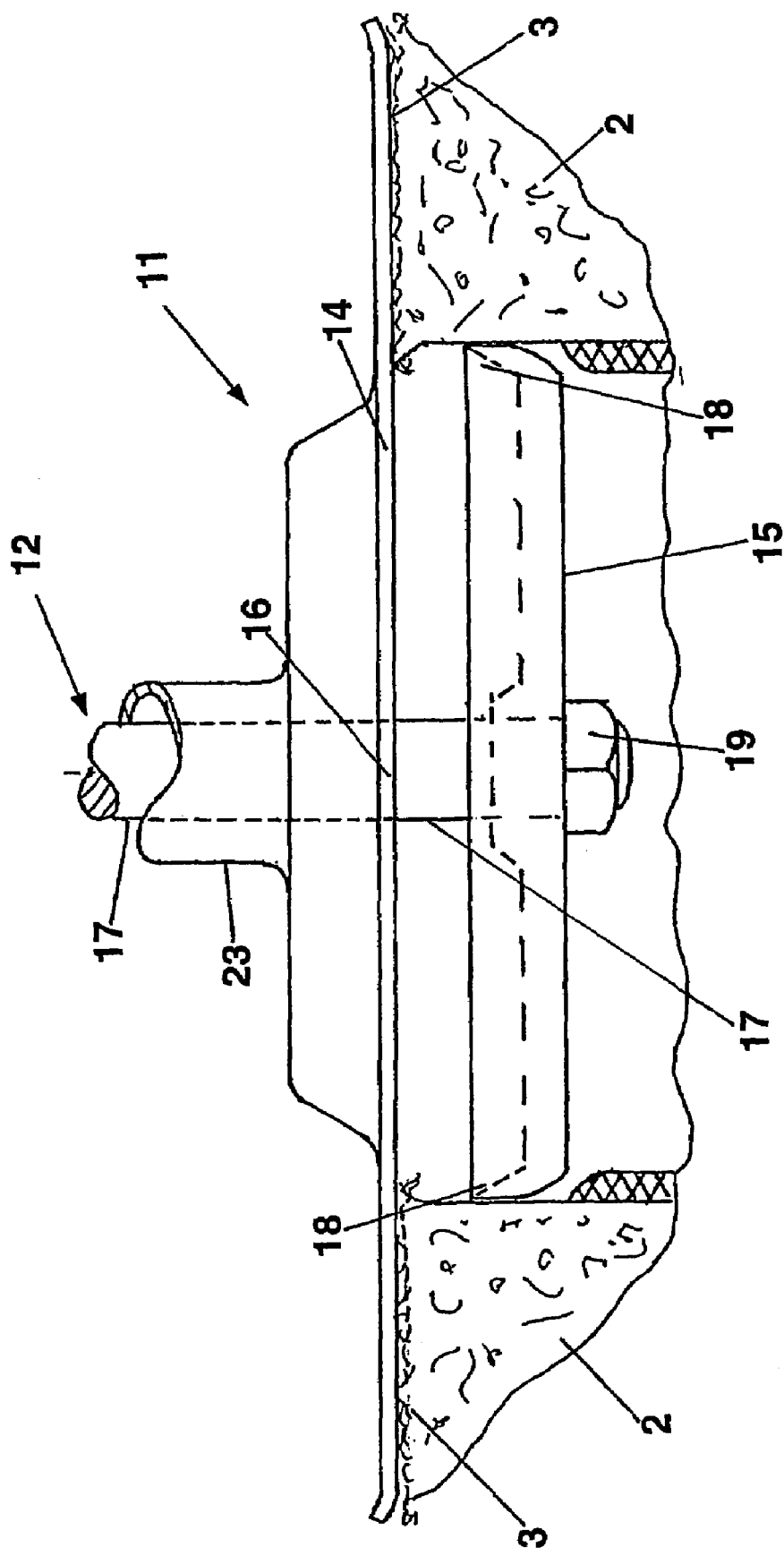
FIG. 4 shows an enlarged partial section side elevation view of a severing mechanism of the hole trimmer located in the top of a golf hole.

FIG. 4 shows in greater detail the elements comprising the severing mechanism (11) and the attachment thereto of the actuation mechanism (12). The severing mechanism (11) includes a first and second cutting surface in the form of a base plate (14) and disc-shaped cutter (15) respectively. The base plate (14) is formed from a circular disc with a diameter substantially in excess of that of a standard golf hole (108 mm/4¼ inches) formed with an optionally hardened underside with a central aperture (16) enabling passage therethrough of an elongated rod (17) orientated about a first longitudinal axis substantially perpendicular to the plane of the base plate (14) and the disc shaped cutter (15). As an alternative to hardening, the underside of base-plate (14) may be of mild steel or other suitable metal including overlays or inserted materials such as nylon.

The elongated rod (17) may be attached to disc-shaped cutter (15) in any suitable manner. However, in order to aid maintenance and ease of manufacture, a convenient means of attachment (as shown in FIG. 4) is via a thread and nut securement (19) at lower distal end of rod (17) passing through, and releasably secured to, the geometric centre of the circular face of cutter (15).

The rod (17) passes through the upper circular face of cutter (15) and is secured on the opposite lower face by said thread and nut arrangement (19). The slight protrusion of the nut below the lower surface of cutter (15) it does not affect the performance of the hole trimmer as the cutting action occurs at the peripheral edges of the disc-shape cutter (15). The lower surface of the cutter (15) does not, and need not come into contact with the bottom of the golf hole (1). Naturally, in alternative applications where the underside surface of the disc (15) is required to be of a particular configuration e.g. planar or hemispherical, precluding the above configuration, then a suitable attachment of the rod (17) would be made to the upper surface only of the disc cutter (15).

In use, the lower surface of the cutter (15) is inserted through the periphery (6) of the hole (1) and pushed downwards until the lower surface of the base plate (14) comes into contact with the upper surface of the green (3) in the area immediately adjacent to the hole (1). Entry into the hole (1) maybe eased in some instances by rotating the cutter (15) by approximately one revolution as it is inserted the first 10–12 millimeters of the hole. This action also assists in realigning the edge of the wall (7) to remove any abnormalities or protrusions. As the dimensions of the circular cutter (15) correspond exactly with the standard golf hole configuration (i.e. a precise circular aperture of a 108 millimeter diameter), the cutter (15) readily locates in the correct position in the hole (1) and prevents any misalignment and/or cutting of oval or in some way misshapen holes.

After the hole trimmer (10) is fully inserted into the hole (1), the cutter (15) is moved vertically upwards about said first longitude axis by the raising of elongated rod (17) until the cutter (15) contacts the lower surface of base plate (14). The contact between the base plate (14) and the cutter (15) is restricted to the extreme outer periphery of cutter (15), i.e. the circular sharpened edge (18) which presses on a corresponding circular region of the underside of base plate (14). Any peripheral material impinging within the hole perimeter (6) will be trapped between the sharpened edge (18) and the lower surface of the base plate (14) and consequently severed as the two cutting surfaces come into cutting contact.

The enlarged circular planar underside of base plate (14) in the region adjacent the hole periphery (6) can also be used to compress any peaking of the green surface (3) in this area.

As referred to above, it will be appreciated that the whole underside of the base plate (14) need not be hardened to withstand the pressure of the cutting contact, and instead the necessary hardening could be applied solely to the contact region, or a hardened annular ring could be inserted in the underside of base-plate (14).

The key principle of the hole trimmer is the upwards cutting action of cutter (15) to sever any material impinging into hole (1).

The embodiment shown in FIG. 4 utilises an actuation mechanism in which elongated rod (17) is moved linearly along said first longitude axis, which in the application of trimming a golf hole, would normally vertically upwards. In order to provide a convenient ergonomic means of effecting said linear movement and said reciprocal movement of elongated rod (17), an elongated outer tubular housing (23) enclosing elongated rod (17) extends upwards from the base plate (14) for a distance approximating to the waist height of a typical adult user.

Figure 5:
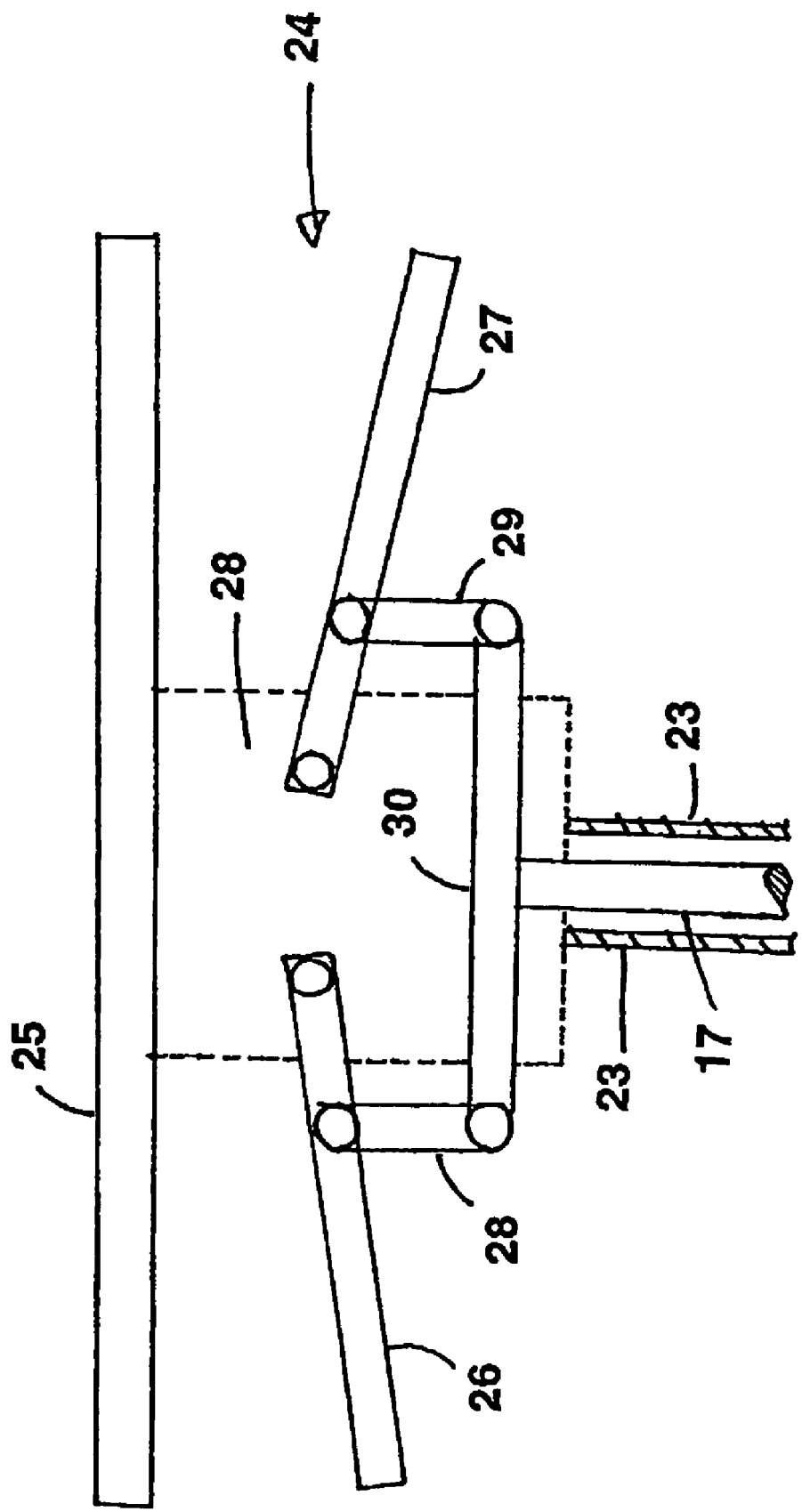
FIG. 5 shows a side elevation of an actuation mechanism of the hole trimmer.
Figure 6:
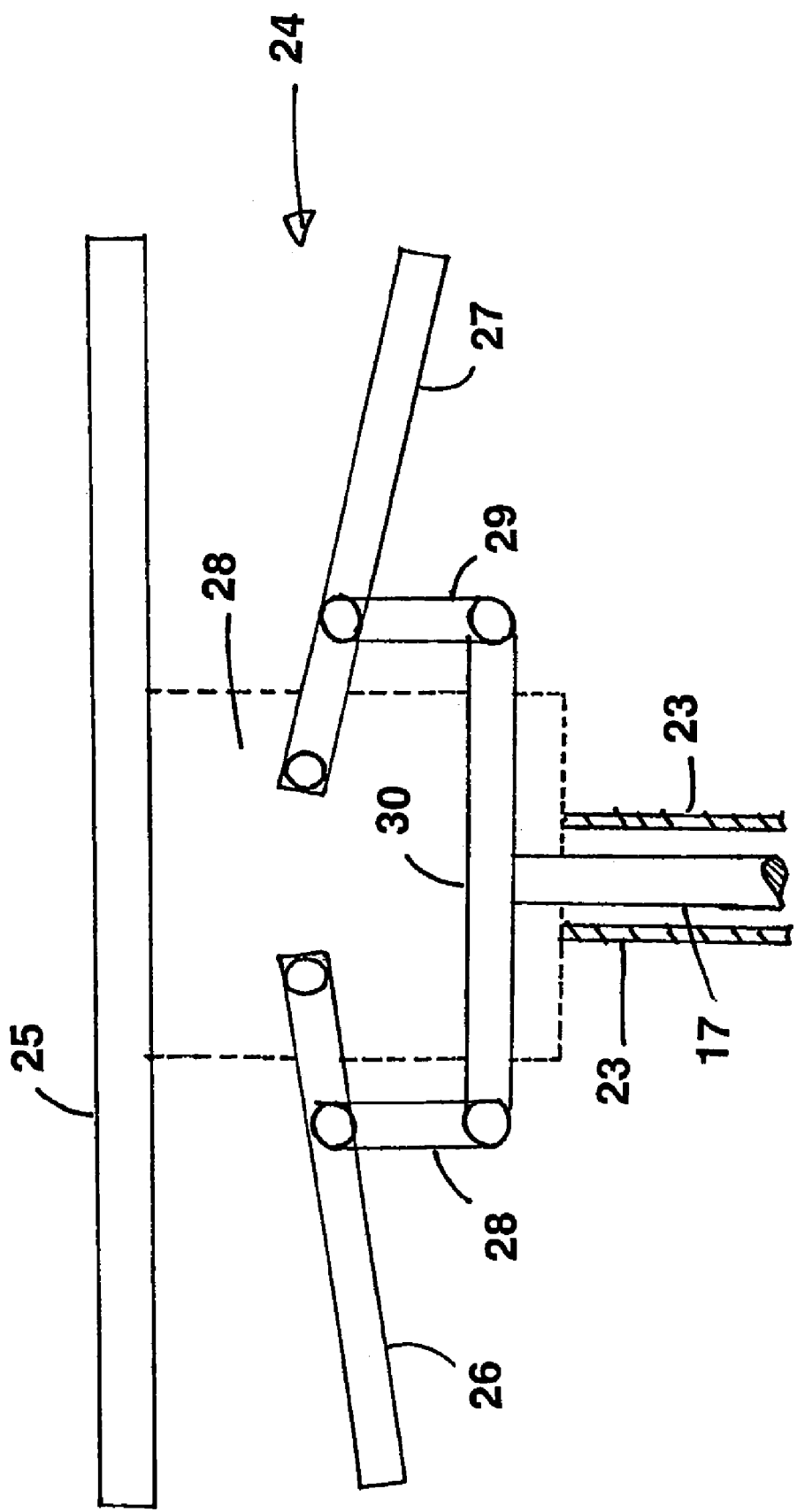

At the distal end of said tubular housing (23), an actuation mechanism in the form of handle and operating linkages (24) is attached, as shown by the partial cutaway section in FIG. 3, and in greater detail in FIG. 5.

A fixed handle (25) is located, perpendicular to the longitudinal axis of rod (17) at the uppermost (in use) end of the hole trimmer (10) and enables a use to grasp two levers (26, 27), each pivotally attached at one end to housing (28) and located below the fixed handle (25).

The elongated tubular housing (23) and fixed handle (25) are rigidly attached to the housing (28). Levers (26, 27) are pivotably connected via linkages (29, 30) to a common T-piece (31) fixed to the elongated rod (17).

A user grasping rigid handle (25) is able to pull both levers (26, 27) upwards thus lifting cutter (15) via rod (17), T-piece (31), and linkages (26, 27). The location of the attachment point of linkages (26, 27) to levers (26, 27) intermediate the ends (between the pivotably attachment to housing (28) and the free ends) governs the degree of mechanical advantage provided.

It will be appreciated that several alternative actuation mechanisms could be employed instead of the purely mechanical arrangement described above. It would be obvious to those skilled in the art that the movement of cutter (15) via rod (17) could be produced by hydraulic activators—either manual or externally powered, electrical or pneumatic drives for example.

Aspects of the present invention have been described by way of example only and it should be appreciated that modifications and additions may be made thereto without departing from the scope thereof as defined in the appended claims.

What is claimed is:

1. A hole trimmer capable of removing peripheral material projecting inside a perimeter of a hole in the ground, said hole trimmer including:
    a severing mechanism with first and second substantially opposed cutting surfaces, configured such that said first cutting surface is incapable of passing through said perimeter, whilst said second cutting surface is capable of passing through said perimeter;
    an actuation mechanism capable of reversibly moving said first and second cutting surfaces towards and away from each other about a first longitudinal axis,
    wherein said first cutting surface has a substantially planar lower surface intersected by said actuation mechanism through an aperture impassable by the second cutting surface;
    and wherein, in use, said second cutting surface is capable of being inserted through said hole past said material until said substantially planar lower surface contacts said perimeter, whereupon, said actuation mechanism is activated to move said second cutting surface along said first longitudinal axis into abutting contact with the substantially planar lower surface of said first cutting surface, severing any material interposed therebetween.

2. A hole trimmer as claimed in claim 1, wherein said first cutting surface is substantially planar and, with respect to said first longitudinal axis, laterally enlarged in comparison to said second cutting surface.

3. A hole trimmer as claimed in claim 1, wherein said hole is a circular golf hole and wherein said second cutting surface is sized to correspond to said golf hole.

4. A hole trimmer as claimed in claim 1, wherein said abutting contact occurs about an at least partially circular outer perimeter of said second cutting surface orientated perpendicular to the first longitudinal axis.

5. A hole trimmer as claimed in claim 1, wherein said second cutting surface is located peripherally on an upper surface of a circular disc.

6. A hole trimmer as claimed in claim 5, wherein said second cutting surface further comprises a lower surface shaped to facilitate entry into said hole past said peripheral material.

7. A hole trimmer as claimed in claim 1, wherein said first cutting surface is a substantially planar surface orientated perpendicular to said first longitudinal axis.

8. A hole trimmer as claimed in claim 1, wherein said abutting contact is formed as a sharpened edge on said second cutting surface engaging simultaneously at all points of the sharpened edge in a pressure contact with the substantially planar lower surface of said first cutting surface.

9. A hole trimmer as claimed in claim 1, wherein said first cutting surface is a plate.

10. A hole trimmer as claimed in claim 9, wherein said plate is hardened.

11. A hole trimmer as claimed in claim 1, wherein the said actuation mechanism includes an elongated rod attached to said second cutting surface and extending through an aperture in said first cutting surface along said first longitudinal axis to an actuation mechanism.

12. A hole trimmer as claimed in claim 11, wherein said actuation mechanism is capable of providing reversible linear movement of said second cutting surface into cutting contact with said first cutting surface.

13. A hole trimmer as claimed in claim 11, wherein said actuation mechanism is composed of manually operable mechanical linkages, providing force multiplication of a user's manual input by a known mechanical advantage configuration.

14. A method of removing peripheral material projecting inside a perimeter of a hole utilizing the hole trimmer as claimed in claim 1, said method including:
    inserting said second cutting surface into said hole past said peripheral material, until said first cutting surface contacts said perimeter;
    activating said actuation mechanism to move said second cutting surface into cutting contact with said first cutting surface, severing any material interposed therebetween.

* * * * *